United States Patent [19]

Patterson et al.

[11] 3,751,071
[45] Aug. 7, 1973

[54] HITCH STRUCTURE FOR AGRICULTURAL IMPLEMENTS

[75] Inventors: Roger Lee Patterson, Fonthill; Henning Isachsen, Merritton, Ontario, both of Canada

[73] Assignee: Deere & Company, Moline, Ill.

[22] Filed: Oct. 30, 1970

[21] Appl. No.: 85,377

[52] U.S. Cl. .............................. 280/478 A, 172/679
[51] Int. Cl. ............................................. B60d 1/14
[58] Field of Search ..................... 280/478, 479, 412, 280/462; 172/679, 285; 292/60, 61, 59, 266, 277, 332, 333

[56] References Cited
UNITED STATES PATENTS

| | | | |
|---|---|---|---|
| 3,410,577 | 11/1968 | Luinstra ......................... | 280/478 A |
| 3,154,325 | 10/1964 | Thompson et al. ............. | 280/478 R |
| 2,950,927 | 8/1960 | Hendrickson ................... | 280/412 X |
| 3,279,819 | 10/1966 | Edmonds ........................ | 280/478 B |
| 2,384,244 | 9/1945 | Forney ............................ | 280/478 R |
| 1,037,302 | 9/1912 | Parent ............................. | 292/332 |

Primary Examiner—Albert J. Makay
Attorney—H. Vincent Harsha, Harold M. Knoth, William A. Murray, Raymond L. Hollister and John M. Nolan

[57] ABSTRACT

A foldable hitch structure for use on an elongated agricultural implement convertible between a wide, generally crosswise operating position and a narrow, generally longitudinal transport position, the hitch comprising a pair of arms pivotally connected to spaced points on the implement frame at their rearward ends and pivotally interconnected at their forward ends. The hitch is adapted for connection to the drawbar of a tractor at a point near the interconnection of the two arms, and one of the arms is telescopic to permit the structure to fold from an operating position, wherein the connection point is located forwardly of the implement, to a transport position, wherein the connection point is located toward one end thereof. A spring biased latch pin is actuated by movement of the telescopic arm to secure the hitch in either position.

8 Claims, 4 Drawing Figures

INVENTORS
ROGER L. PATTERSON
HENNING ISACHSEN

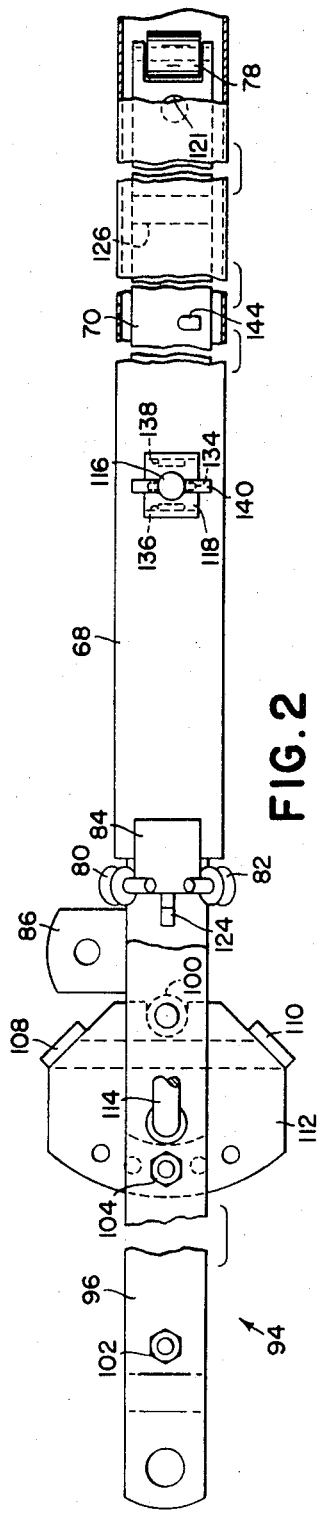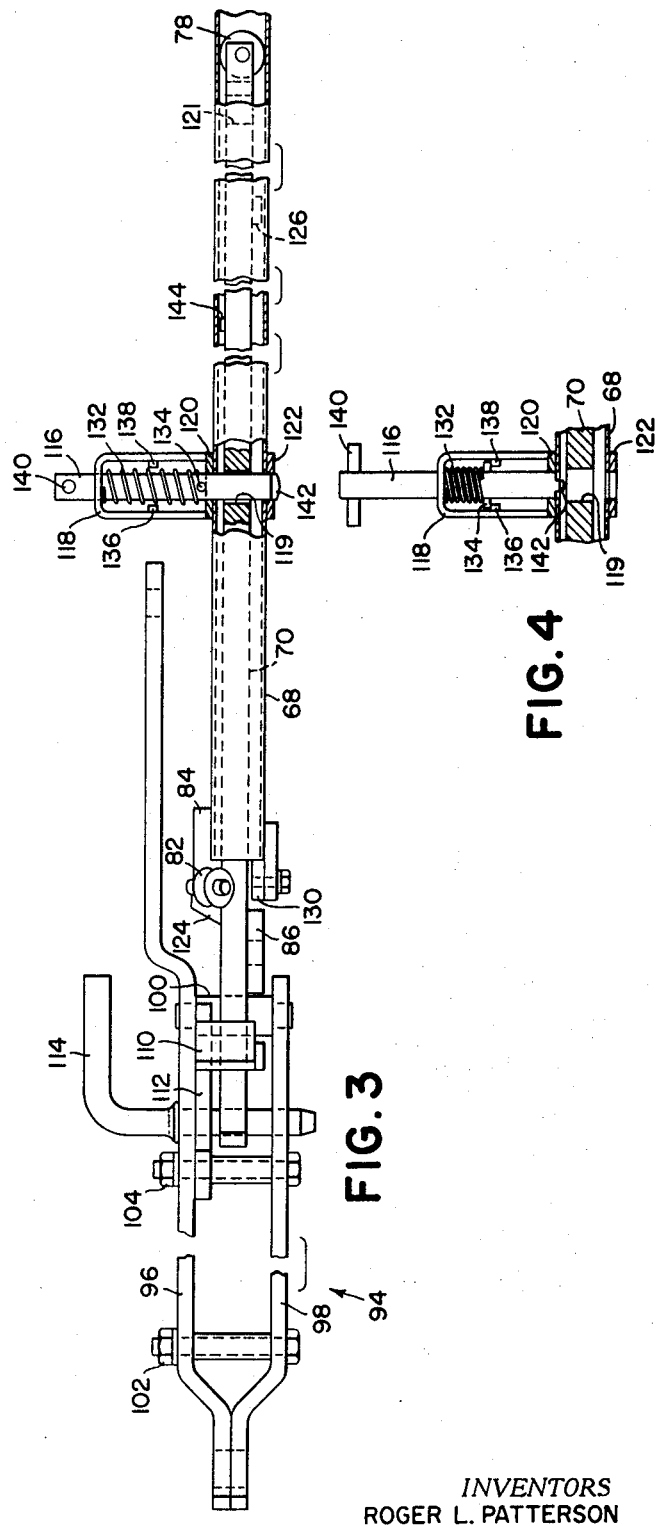

HITCH STRUCTURE FOR AGRICULTURAL IMPLEMENTS

The present invention relates generally to agricultural implements, and more particularly to a foldable hitch structure for use on an implement of the type convertible between a wide, generally crosswise operating position and a narrow, generally longitudinal transport position.

Provision must be included in the design of large agricultural implements to reduce their width for transport purposes due to restrictions imposed by the width of existing roadways, gateways, and the like. Although various means have been employed in the past depending upon the particular implement, in the case of disk tillers and other implements having an elongated configuration, the conventional method of providing a decreased width for transport is to transport the implement in an endwise manner. Since the draft hitch structure of a conventional disk tiller extends substantially forwardly of the elongated frame in the operating position, conversion of the implement to an endwise transport position in the past has necessitated a rearrangement of the draft hitch to further reduce the transport width, plus the addition of a separate transport hitch on the end of the implement. On machines heretofore available, such steps have involved additional cost and considerable time and effort on the part of the operator to effect.

SUMMARY OF THE INVENTION

Accordingly, it is the primary object of the present invention to provide a hitch structure for use on a disk tiller or similar implement adapted for endwise transport which is convertible between operating and transport positions with a minimum expenditure of time and effort on the part of the operator. More particularly, it is an object to provide such a hitch structure comprising a pair of interconnected, forwardly extending arms, one of the arms being telescopic to permit the structure to fold between an operating position, in which the tractor connecting point on the hitch is disposed forwardly and between the ends of the implement frame, and a transport position, in which the connecting point is disposed adjacent to the frame and toward one end thereof. It is a further object to provide spring-biased latch means actuated by movement of the telescopic arm to lock the structure in either position.

In pursuance of these and other objects, the hitch structure of the present invention comprises, generally, a first arm including a pair of telescopic members, one of the members being pivotally mounted on the frame toward one end thereof and the other member being movable longitudinally within the first. A second arm of fixed length is pivotally mounted on the frame toward the opposite end thereof and is interconnected at its outer end to the longitudinally movable member of the first arm. A spring-biased latch pin acts between the two members comprising the telescopic arm to lock the arm, and thereby the entire hitch structure, in either its transport or operating position. Upon manual disengagement of the pin the arm is free to telescope, thereby permitting the hitch structure to move between the two positions. The pin is locked out of engagement with the longitudinally movable member by rotating it until a stop on the pin engages a stop on the arm. As the arm telescope between positions a projection on the movable member contacts an offset portion of the pin, thereby rotating the stop on the pin out of engagement with the stop on the arm and releasing the pin from its disengaged position. The pin is thereafter free to drop into its locking position when a pin-receiving aperture in the movable member, corresponding with one of the hitch positions, comes into alignment therewith.

BRIEF DESCRIPTION OF THE DRAWINGS

The preferred embodiment of the present invention will be described in conjunction with the accompanying drawings in which:

FIG. 2 is an enlarged plan view of the telescopic arm and latch device of the invention, with portions broken away to more clearly illustrate its construction;

FIG. 3 is a side view of the arm shown in FIG. 2, with the latch device shown in its engaged position, and, FIG. 4 is a side view of the latch device in its disengaged position.

DESCRIPTION OF THE PREFERRED EMBODIMENT

Figure 1:
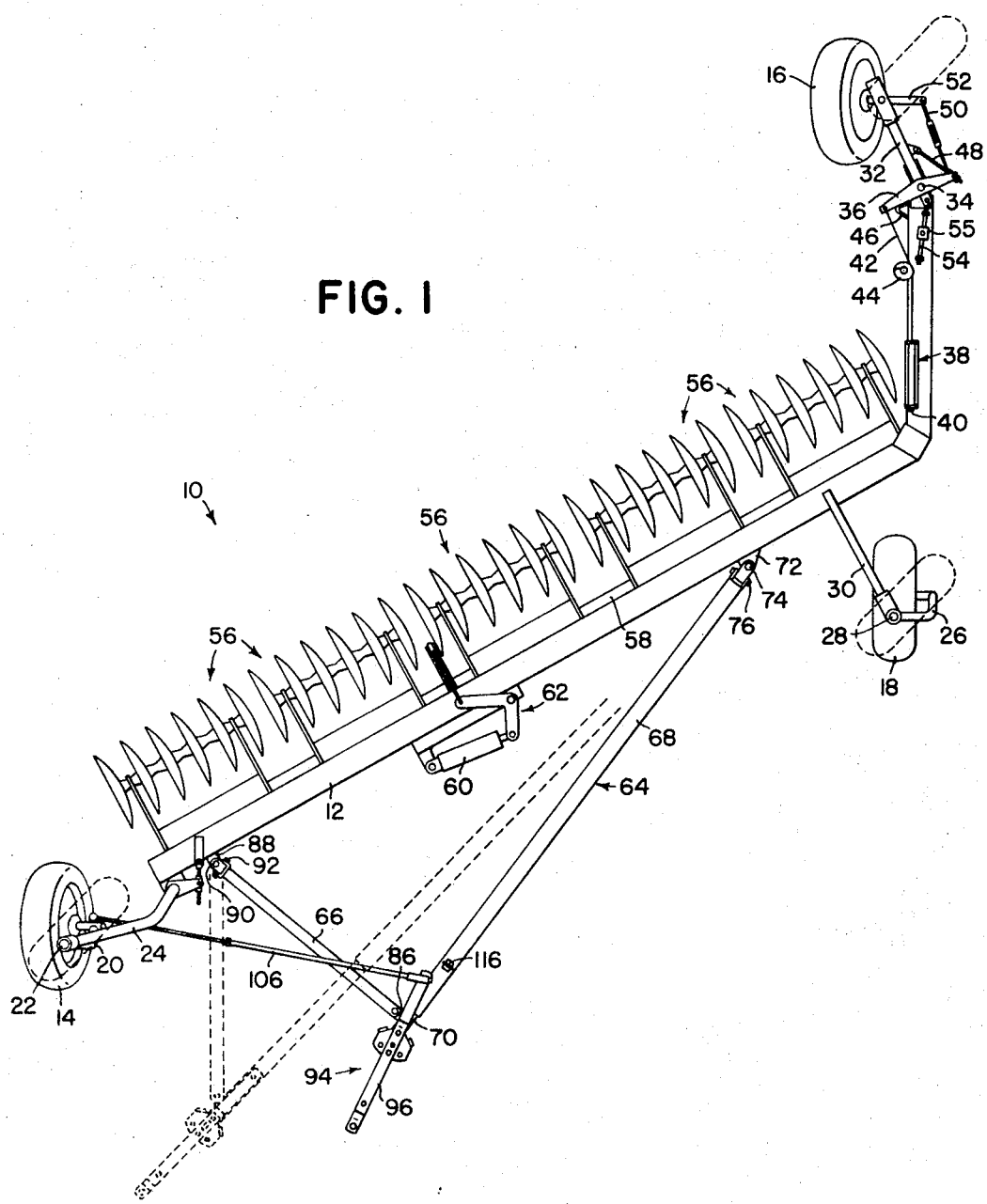
FIG. 1 is a plan view of a disk tiller incorporating the foldable hitch structure of the present invention, the transport positions of the implement and hitch being shown in dashed lines.

Referring first to FIG. 1, the hitch structure of the invention is illustrated as incorporated on a disk tiller 10, the tiller, as is conventional in such implements, having a generally crosswise working position, indicated by the direction of the wheels in solid lines in the figure, and a generally longitudinal or endwise transport position, indicated by the direction of the wheels in dashed lines. The tiller includes an elongated frame structure 12 supported relative to the ground by a furrow wheel 14, a rear furrow wheel 16, and a land wheel 18. The front furrow wheel 14 is carried by a generally vertical arm 20 which is pivotally mounted at 22 on the outer end of a second, laterally extending arm 24. The pivotal mounting 22 permits the wheel 14 to assume the dashed line transport position and to act as a steerable wheel as will be subsequently described. The laterally extending arm 24, in turn, is adjustably mounted on the right front corner of the frame 12 to permit lateral adjustment of the wheel position. In a somewhat similar manner, the land wheel 18 is carried by a generally vertical arm 26 pivotally mounted at 28 to the forward end of a second arm 30, the pivotal mounting 28 permitting the wheel 18 to assume its transport position and to caster during operation of the tiller. The rear end of the arm 30 is rigidly connected to the frame 12. The mechanism mounting the rear furrow wheel 16 on the frame is of conventional design and need not be described in detail. In general, the wheel 16 is carried on the end of a rearwardly extending arm 32 pivoted at 34 on the end of the frame 12. A second arm 36 is held rigid and generally perpendicular to the arm 32, and a bank of coil springs 38, anchored to the frame at 40, acts through a flexible cable 42 trained around a variable radius sheave 44 to bias the arm 36 against a triangular stop 46 on the frame. The wheel 16 is thus normally held in the solid line position, but it can pivot about the point 34 against the urging of the springs 38 to assume the dashed line position for transport purposes, and can pivot further to negotiate left-hand turns. An adjustable link 48, holding the arms 32 and 36 rigid, permits adjustment of the lateral position of the wheel 16, and an adjustable link 50, interconnecting the wheel axle 52 and the arm 36, permits adjustment of the angle of the wheel. A third link assembly 54 mounted on the forward end of the arm 32 and extending through a trunion 55 on the frame is operable to lock the wheel 16 in its transport position.

Five gangs of disks 56 are mounted along the rear of the frame 12 for vertical movement into and out of engagement with the ground. Each gang is independently resiliently mounted to enable the implement to maintain a uniform disking depth despite lateral variations in the ground level. In general, the forward ends of each of the gangs 56 are resiliently coupled to an elongated shaft 58 extending along the rear of the frame 12 and parallel therewith. A hydraulic cylinder 60 acts through a linkage designated generally at 62 to rotate the shaft and thereby raise and lower the disks.

The hitch structure of the invention comprises, generally, a pair of arms 64 and 66 connected at their rearward ends to longitudinally spaced points on the frame 12 and interconnected at their forward ends to form a triangle with the frame 12. As indicated with dashed lines in FIG. 1, the arm 64 is formed of two telescopically arranged members, the forward end of the arm 66 being pivotally connected to the movable member of the arm 64 to permit the entire structure to fold inwardly toward the frame 12 and extend longitudinally toward the right forward end thereof for transport purposes.

The telescopic arm 64, as illustrated in detail in FIGS. 2 and 3, is composed of a first, hollow channel member 68, and a second member 70 received within the member 68 and movable axially relative thereto. The rear end of the hollow member 68 is mounted on a bracket 72 fixed to the front side of the frame 12, for pivotal movement about vertical and horizontal axes indicated at 74 and 76, respectively.

A single, cylindrical roller 78, mounted in the bifurcated inner end of the axially movable member 70, and a pair of inclined rollers 80 and 82, mounted on a block 84 fixed to the outer end of the hollow member 68 and engaging the upper edges of the member 70, serve as bearing means between the members 68 and 70. A bracket 86 is fixed to the outer end of the member 70 and extends outwardly therefrom to pivotally receive, at 87, the outer end of the second arm 66, the inner end of the arm 66 being mounted on a bracket 88 fixed to the forward end of the frame 12 for pivotal movement about vertical and horizontal axes indicated at 90 and 92, respectively. From the foregoing description, it will be apparent that as the hitch structure folds between its operating and transport positions, the member 68 of the telescopic arm 64 will pivot about the vertical axis 74, the arm 66 will pivot about the vertical axis 90, the member 70 of the arm 64 will move axially within the member 68, and the arm 66 will pivot about the vertical axis 87 relative to the member 70.

Mounted on the outer end of the member 70 and movable therewith between the two positions is an assembly 94 adapted for connection to the drawbar of the tractor. As is apparent from FIG. 1, the connecting assembly 94 is thereby movable between an outer or operating position forwardly of and generally between the ends of the tiller, and an inner or transport position toward one end thereof. The assembly 94 comprises upper and lower members 96 and 98, respectively, extending above and below the outer end of the axially movable member 70 and pivotally mounted relative thereto on a vertical pin 100, the pin 100 extending through and fixed to the member 70. The forward ends of the members 96 and 98 abut each other and are provided with aligned apertures for receiving a suitable hitch locking pin (not shown), while the rear portions of the members are maintained in rigid, vertical spaced relation with fore-and-aft bolt and spacer assemblies 102 and 104, respectively. An adjustable steering arm 106, as shown in FIG. 1, connects the rearward end of the upper member 96 with the arm 20 carrying the front furrow wheel 14. During operation of the tiller, the position of the wheel 14 is thus governed by the position of the assembly 94. In straight-ahead work the positions of the assembly and wheel approximate those shown in solid lines in FIG. 1, the wheel thereby maintaining the tiller in the proper working position. When a left turn is negotiated by the tractor, however, the rear end of the member will swing toward the wheel, and the latter will be turned to the left to guide the tiller around the turn. Swinging movement of the connecting assembly 94 is limited by a pair of stops 108 and 110 on opposite sides of the member 70 and engageable therewith, the stops being fixed to the sides of a plate 112 adjustably held against the lower surface of the member 96 by the rear bolt and spacer assembly 104, and further maintained in position by means of a notch in its rear end engaging the pin 100. When the tiller is prepared for transport the arm 106 is removed, the wheel thus being free to caster, and the assembly 94 is locked in alignment with the arm 64, as shown in FIGS. 2 and 3, by means of an L-shaped pin 114 inserted through aligned apertures in the members 96, 112, 70, and 98.

A spring-biased latch pin 116, illustrated in detail in FIGS. 3 and 4, serves to maintain the hitch structure in either its operating or its transport position by preventing relative longitudinal movement between the members 68 and 70 of the telescopic arm 64. The pin is mounted on the upper surface of the member 68 adjacent to the outer end thereof and is axially movable through aligned apertures in the bight portion of a U-shaped supporting member 118, the upper and lower walls of the member 68, and the axially movable member 70, the latter member having two such apertures 119 and 121 longitudinally spaced to correspond with the operating and transport positions, respectively, of the hitch structure. The pin 116 is movable between a raised, inoperative position shown in FIG. 4 and a lowered, operative position shown in FIG. 3. Reinforcing plates 120 and 122 are provided on the upper and lower walls, respectively, of the member 68 around the pin-receiving apertures therein. A pair of fore-and-aft stops 124 and 126 on the member 70 abut stop blocks 84 and 130, respectively, on the member 68 to define the operating and transport positions of the arm 64. The stops are so positioned that the corresponding aperture in the member 70 is properly aligned with the hitch pin 116 in each position. The pin 116 is biased axially toward its lowered, operative position by means of a coil spring 132 acting between the upper closed end of the U-shaped support 118 and a small pin 134 extending outwardly from opposite sides of the pin 116. In addition to serving as a stop for the spring 132, the small pin 134 serves also to limit the downward movement of the pin 116 by contacting the upper surface of the reinforcing plate 120 (FIG. 3), and as a stop for engaging a pair of fore-and-aft projections 136 and 138 on the walls of the U-shaped support 118, to thereby lock the pin in its raised, inoperative position (FIG. 4). As is apparent from the size and location of the projections 136 and 138, they are operable to retain the pin in its inoperative position only when the latter is rotated about its axis to a locking position in which the small pin 134 is disposed in longitudinal orientation relative to the arm 64, the latter position illustrated in FIG. 4. A handle 140 is provided on the upper end of the pin 116 for raising and rotating it into the locking position for engagement with the projections 136 and 138.

In the raised, inoperative position of FIG. 4, an axially offset projection 142 on the extreme lower end of the pin 116 extends below the surface of the top wall of the member 68 and in close proximity to the top surface of the movable member 70. The projection 142 is formed on the pin to lie crosswise of the arm 64 when the pin is rotated to its locking position. In the embodiment illustrated, for example, since the small pin 134 is disposed in longitudinal alignment with the arm 64 when the pin 116 is rotated to its locking position, the projection 142 is necessarily disposed perpendicularly to the small pin 134. A small projection 144 is provided on the upper surface of the member 70 between the apertures 119 and 121 and offset from the centers thereof to engage the radial outer end of the projection 142 on the lower end of the pin 116, and thereby rotate the latter 90° from its locking position shown in FIG. 4 to an unlocking position shown in FIG. 3. When so rotated the small pin 134 is disengaged from the projections 136 and 138 and, the pin 116 is thus moved by the spring 132 downwardly against the top surface of the member 70 until one of the holes 119 or 121 comes into alignment therewith, whereupon the pin will drop through the hole to lock the arm in position.

The operation of the hitch structure will now be described. Since the steps for converting the implement from the transport to the operating position are merely a reversal of those required to convert from the operating to the transport position, only the latter will be described. Initially, the disk gangs 56 are raised clear of the ground by means of the cylinder 60. The implement is then pulled to the left, causing the rear furrow wheel 16 to pivot about the pin 34 to the position indicated with dashed lines in FIG. 1, and the wheel is locked in the latter position. The steering arm 106 is then removed and the connecting assembly 94 is aligned with the arm 64 and locked with the pin 114. The latch pin 116 is next manually withdrawn from its operative position in the aperture 119 in the number 70, and rotated to its locking position wherein the outer ends of the small pin 134 engage the projections 136 and 138 on the U-shaped support 118, thereby locking the pin 116 in the raised, inoperative position and releasing the structure from its operating position. As the tractor is pulled forwardly, the inner member 70 of the arm 64 will be pulled outwardly through the hollow member 68 as the structure folds to the dashed line transport position of FIG. 1. As the arm 64 telescopes, the projection 144 on the member 70 will engage the outer end of the projection 142 on the lower end of the pin 116, thereby rotating the pin to its unlocking position and releasing the pin from its raised, inoperative position. The rounded lower end of the projection 142 will thus bear against the surface of the member 70 until the stop 126 engages the stop block 130 and the aperture 121 in the member 70 is aligned with the pin, whereupon the pin will drop through the aperture 121 to lock the structure in the transport position.

We claim:

1. Hitch structure comprising:
   a. a telescopic arm movable between extended and retracted positions and including a pair of relatively longitudinally movable members;
   b. a latch pin acting between said members for releasably securing said arm in its extended and retracted positions, said pin being mounted on one of said members for axial movement between an operative position wherein said latch pin is engageable with the other of said members at spaced points thereon corresponding with the extended and retracted positions thereof, and an inoperative position, and for rotational movement about its axis between locking and unlocking positions;
   c. means acting between said one member and said latch pin for biasing the latter axially toward its operative position;
   d. first stop means on said one member;
   e. second stop means on said pin for locking said latch pin in its inoperative position out of engagement with said other member, said second stop means being engageable by said first stop means when said pin is moved axially out of engagement with said other member and rotated to its locking position; and
   f. means on said other member between said spaced points thereon engageable with said pin in response to movement of said other member between its extended and retracted positions and operative to rotate said pin from its locking to its unlocking position.

2. The invention defined in claim 1 including stop means on said members defining the extended and retracted positions of said arm.

3. The invention defined in claim 1 including a first, axially offset projection on said pin, and a second projection on said other member between said spaced points thereon and engageable with said first projection as said other member is moved between its extended and retracted positions.

4. The invention defined in claim 1 wherein said second stop means comprises a radial projection on said pin, and including structure on said one member supporting said pin for axial sliding movement, and a coil spring surrounding said pin and acting between said support structure and said projection to axially bias said pin for engagement with said other member.

5. The invention defined in claim 4 wherein said projection is engageable with said one member to limit axial movement of said pin.

6. In combination with an elongated agricultural implement having a mobile frame movable between a wide, generally crosswise operating position and a narrow, generally longitudinal transport position, hitch means convertible between said operating and transport positions comprising:
   a. first arm means including first and second relatively longitudinally movable members, said first member being connected at one end to said frame for horizontal pivotal movement;
   b. second arm means connected at one end to said frame for horizontal pivotal movement at a point on said frame spaced from said first member, and connected at its opposite end for horizontal pivotal movement to said second member, whereby said first and second arm means are horizontally foldable between transport and operating positions toward and away from said frame, respectively;

c. means on the outer end of one of said arm for connection to the drawbar of a tractor and movable with said one arm between said operating and transport positions;

d. a latch pin acting between said first and second members for releasably securing said first arm means in its operating and transport positions, said pin being mounted on one of said members for axial movement between an operative position wherein said latch pin is engageable with the other of said members at spaced points thereon corresponding with the operating and transport positions thereof, and an inoperative position, and for rotational movement about its axis between locking and unlocking positions;

e. means acting between said one member and said latch pin for biasing the latter axially toward its operative position;

f. first stop means on said one member;

g. second stop means on said pin for locking said latch pin in its inoperative position out of engagement with said other member, said second stop means being engageable by said first stop means when said pin is moved axially out of engagement with said other member and rotated to its locking position; and h. means on said other member between said spaced points thereon engageable with said pin in response to movement of said other member between its extended and retracted positions and operative to rotate said pin from its locking to its unlocking position.

7. The invention defined in claim 6 wherein said latch pin is mounted on said first member.

8. The invention defined in claim 6 wherein said connection means is mounted on said second member.

* * * * *